3,117,881
PROCESS FOR MAKING DEVITRIFIED PRODUCTS
Kenneth M. Henry, Toledo, and William E. Smith, Sylvania, Ohio, assignors to Owens-Illinois Glass Company, a corporation of Ohio
No Drawing. Filed Oct. 15, 1959, Ser. No. 846,551
34 Claims. (Cl. 106—39)

The present invention relates to a process for making devitrified products of extremely high strengths and more particularly to a method of making a crystalline article by the controlled devitrification of a vitreous article.

The accidental or unintentional devitrification of glass has long constituted a problem in the glass-making art and, in the past, every effort has been expended to prevent the formation of crystals in glass, both during forming and annealing. It has now been found that by the deliberate conversion of a suitable, initially vitreous composition to a devitrified predominately crystalline structure, e.g., on the order of 90 to 95% crystalline, amazing physical properties, such as flexural strength, can be obtained in the devitrified product. Flexural strengths on the order of 1000,000 to 150,000 pounds per square inch can be attained and flexural strengths in excess of 40,000 pounds per square inch are standard.

The deliberate conversion of a vitreous composition to a devitrified product, as accomplished by the method of the present invention, involves (1) the incorporation of a nucleating agent in the original vitreous composition and (2) the heat treatment of the vitreous composition through a heat treatment cycle to initiate and foster devitrification of the original composition to a substantially crystalline structure. The devitrification can be accomplished after formation of the vitreous composition to an article of the size and shape of the finished article, and no substantial distortion and only a small compensatable dimensional change occurs during the transition. Thus, conventional glass forming methods, such as pressing, blowing, tube and rod drawing, can be utilized to form the vitreous article prior to devitrification.

The present invention now proposes the utilization of a nucleating agent comprising a mixture of zirconia ($ZrO_2$) and an additional oxide selected from the group consisting of $TiO_2$, $V_2O_5$, $CoO$, $NiO$, $MoO_3$, $Fe_2O_3$, or $ThO_2$. The function of such a nucleating agent is to provide in the vitreous composition a myriad of submicroscopic crystallization centers, or nuclei, upon which grow the crystals subsequently formed by the vitreous composition during devitrification. Titania alone has earlier been suggested as a nucleant in similar devitrification processes. It has now been found that a mixture of zirconia and one of the aforementioned metal oxides can be more effectively utilized to yield high strength devitrified products from certain normally vitreous compositions when such compositions are melted, formed, and heat treated.

The heat treatment of the vitreous compositions of this invention occurs preferably in three phases; (1) a nucleation phase at substantially the annealing point (log viscosity 13.5), (2) a development phase slightly below the fiber softening point (preferably at a log viscosity ranging from log 8 to log 12), and (3) a crystallization phase at preferably 150 to 300° F. above the fiber softening point which is log viscosity 7.65. The development phase is of primary importance in developing a rigid crystalline framework throughout the article, thereby preventing deformation at the higher crystallizing temperature and insuring uniform later crystallization.

It is, therefore, an important object of this invention to provide an improved method for the devitrification of vitreous compositions to yield high strength, predominantly crystalline products.

Another object is the utilization of a mixture of zirconia and a second oxide as a nucleant in the devitrification of vitreous compositions.

It is a further object to provide a devitrification process wherein a vitreous composition containing relatively minor amounts (less than about 10%) of a mixture $ZrO_2$ and a secondary nucleating oxide is devitrified according to a predetermined heat treatment to successively form submicroscopic nuclei throughout the vitreous composition and subsequently to form on said nuclei a crystalline structure in which 50 to 98%, and preferably from 90 to 95%, of the original vitreous composition is crystalline.

Yet another object is the devitrification of an article of vitreous composition containing a mixture of zirconia and a secondary nucleant oxide by subjecting the vitreous composition to a temperature corresponding to a viscosity ranging from log 8 to log 12 to develop a rigid crystalline framework in the article.

Other and further objects of this invention will become apparent from the following description:

BASE COMPOSITIONS

Specifically, base compositions of the present invention contain the following ingredients with the preferred limits shown in column 2:

|  | Broad Range | Preferred Range |
| --- | --- | --- |
| $SiO_2$ | 40 to 70% | 40 to 60%. |
| $Al_2O_3$ | 15 to 35% | 17 to 32%. |
| $MgO$ | 5 to 15% | 6 to 12%. |

Such preferred base compositions are selected so that the primary crystalline phases upon devitrification will lie within the various fields of mullite, cordierite, sapphirine, tridymite, etc., of the phase diagrams of the systems $Al_2O_3$—$SiO_2$ and $MgO$—$Al_2O_3$—$SiO_2$. By selection of the $MgO$—$Al_2O_3$—$SiO_2$ ratio, the devitrification products may be varied and the predominant crystalline phases of the final product can be preselected.

In general, it can be shown from examples contained herein that the maximum strength that can be developed in a given composition is dependent to a certain extent on the predominant crystalline phase present. It has been found that increasing strength is developed in the order cordierite-mullite-tridymite in moving from one predominant phase to the next.

Table I shows examples illustrating the preferred limits as described above.

Examples illustrating preferred $SiO_2$, $Al_2O_3$ and $MgO$ composition limits:

Table I

| Ingredient | Percent by Weight | | | | |
| --- | --- | --- | --- | --- | --- |
| $SiO_2$ | 60.0 | 60.0 | 41.9 | 47.2 | 46.0 |
| $Al_2O_3$ | 17.3 | 19.3 | 30.5 | 31.0 | 30.2 |
| $MgO$ | 10.0 | 10.0 | 11.2 | 6.0 | 11.1 |
| $B_2O_3$ |  |  | 5.0 |  | 1.0 |
| $LiF$ |  |  |  | 1.0 |  |
| $NaF$ | 3.0 | 2.0 | 1.0 |  |  |
| $Li_2O$ |  |  | 0.75 |  |  |
| $ZrO_2$ | 8.0 | 7.0 | 8.0 | 8.0 | 7.0 |
| $TiO_2$ | 1.5 | 1.5 | 1.5 | 1.5 | 1.8 |
| $SnO_2$ | 0.2 | 0.2 | 0.2 | 0.2 | 0.2 |
| $CaO$ |  |  |  | 5.0 |  |
| $PbO$ |  |  |  |  | 2.0 |

HEAT TREATMENT (° F.)

| Hours at | 1,350–1<br>1,600–1<br>1,880–1½ | 1,450–1<br>1,750–1<br>1,920–1½ | 1,450–1½<br>1,650–1½<br>1,850–1½ | 1,450–1½<br>1,700–1½<br>1,950–1½ | 1,420–1<br>1,680–1<br>1,900–1½ |

Table I—Continued
STRENGTHS

| Flexural Strength (p.s.i.) | 20,680 | 72,540 | 40,720 | 82,250 | 54,670 |
|---|---|---|---|---|---|
| Crystalline Phases | | | Sapphirine Cordierite | Tridymite Sapphirine Mullite | Mullite Sapphirine Tridymite |

MODIFYING AGENTS

Various modifying agents can be added to the base compositions, which consist esentially of $SiO_2$, $Al_2O_3$, and $MgO$ as hereinbefore set forth, to vary the melting and forming characteristics of the vitreous composition and to vary the degree and readiness of devitrification.

In general, oxides or fluorides of alkali metals or alkaline earth metals can be added to improve the melting characteristics of the batch. Such fluxing agents are added to the batch at the expense of all other components or at the expense of other alkaline earth oxides (primarily $MgO$). Generally, excessive amounts of such fluxing agents reduce the final strength of the crystalline product and therefore the hereinafter recited preferred limits are to be desired.

Tin oxide ($SnO_2$), while not considered a fluxing agent when present in small quantities as described here, is useful as an oxidizing agent and assists in fining and homogenizing the glass.

Exemplary of alkali metal salt fluxing agents are sodium fluoride, sodium oxide, potassium fluoride, potassium oxide, lithium fluoride, and lithium oxide.

A particularly useful modifying agent is calcium fluoride, which not only benefits melting and forming of the glass, but also promotes devitrification by developing a non-deforming skeletal framework of crystallites at temperatures below the deformation range of the glass. To prevent excessive fluorine losses during melting, 2% or less $CaF_2$ is preferably utilized.

Both lithium oxide and lithium fluoride are excellent promoters of melting and when present in limited quantities are also promoters of devitrification. (See Tables IV and V.)

Boric oxide, a fluxing agent, is also extremely useful in controlling the relative amounts of glassy matrix and crystalline material. $B_2O_3$ also lowers the thermal expansion coefficient of the finished product. (See Table VI and VII.)

Another method for controlling the crystal-glass ratios in the finished product is the addition of small quantities of non-devitrifying glass composition which can be added as the oxides or more conveniently as cullet. Examples in Table XIII contain 5 and 10% respectively of a typical soda-lime glass added as cullet.

To summarize the various modifying agents, the following modifiers may be used in the following amount expressed as parts by weight of the total batch:

Table II

| Modifier | Broad range | Preferred range |
|---|---|---|
| $SnO_2$ | 0-2 | .05-1 |
| $NaF$ | 0-3 | .05-1 |
| $Na_2O$ | 0-2 | .05-1 |
| $K_2O$ | 0-3 | .05-1 |
| $CaF_2$ | 0-8 | .05-2 |
| $Li_2O$ | 0-5 | .05-2 |
| $LiF$ | 0-5 | .05-2 |
| $B_2O_3$ | 0-5 | .05-3 |
| $KF$ | 0-3 | .05-1 |
| $CaO$ | 0-10 | .05-5 |
| $PbO$ | 0-5 | .05-2 |
| $BaO$ | 0-10 | .05-2 |

This list should not be construed as containing all the possible modifying agents but is merely indicative of the relative quantities of modifiers that can be added to the base composition without shifting the final product to a different crystalline phase field.

To yield a substantially crystalline product from the above defined base compositions plus any modifying agents, the devitrification of such base compositions must be accurately controlled and must proceed in an orderly, predetermined fashion.

To control the devitrification, two interrelated factors are utilized, one such factor is the presence of a nucleating agent and the other such factor is the utilization of a heat treatment cycle.

NUCLEATING AGENTS

The utilization of a mixture of $ZrO_2$ and a secondary nucleant oxide has been found to yield consistently high strength materials, particularly where compositions are used which are at or near the actual composition point of cordierite ($2MgO \cdot 2Al_2O_3 \cdot 5SiO_2$) located in the primary phase field of mullite ($3Al_2O_3 \cdot 2SiO_2$) in the phase diagram. Secondary crystalline phases in the final product may include sapphirine ($4MgO \cdot 5Al_2O_3 \cdot 2SiO_2$), tridymite ($SiO_2$), spinel ($Al_2O_3 \cdot MgO$), and zirconia ($ZrO_2$).

The preferred nucleating agents of this invention fall within the range of at least 6.0% $ZrO_2$ and from 1.0 to 1.75% of a secondary nucleant selected from the group consisting of $TiO_2$, $CoO$, $NiO$, $V_2O_5$, $MoO_3$, $ThO_2$ and $Fe_2O_3$. No advantage is obtained from utilizing more than about 8% $ZrO_2$ in combination with such a secondary oxide and the single combination of 7% $ZrO_2$ and 1.5% $TiO_2$ forms a preferred nucleant mixture of this invention. (See Table VI, Example 12.)

MELTING AND FORMING

The batch, consisting of the base $MgO \cdot Al_2O_3 \cdot SiO_2$ composition, any modifying agents, and the nucleating agent, is melted by any normal glass melting procedure and apparatus. Due to the composition, a somewhat higher than normal melting temperature of between about 2600° F. to 3000° F. is utilized.

Forming of the initial vitreous article can be carried out by any of the well-known glass forming operations of drawing, blowing, pressing or the like. Suitable forming temperatures for such compositions average somewhat higher than normal, as would be expected. The forming temperature of such compositions averages about 100° F. below the melting temperature and ranges from about 2500° F. to about 2800° F.

HEAT TREATMENT

Apparently, though not so far proved conclusively, the crystallization takes place during heat treatment through successive stages.

More specifically, these stages, in the preferred embodiment of this invention, are as follows:

A. The maintenance of the composition, actually as the formed vitreous article, at a temperature corresponding substantially to the annealing point (viscosity of log 13.5). The material is held, thus, at substantially the annealing temperature with a variation of from about 20° F. below the annealing temperature to about 50° F. above the annealing temperature. The holding of the composition at this temperature leads to the formation of sub-microscopic crystals of the nucleating agent dispersed throughout the glassy matrix. This heat treatment stage is hereinafter termed the "nucleation stage."

B. The maintenance of the article, after nucleation, at a temperature corresponding to a viscosity of log 8 to log 12, preferably at log 8. For any given original composition, this temperature is preferably about 10 to 30° F. below the fiber softening point. During this heat treatment stage, the base composition will partially crystallize and a rigid, porous crystalline structure is predominantly formed from the base composition ingredients and not from the nucleating agents. The sub-microscopic nuclei dispersed in the glassy matrix at the end of the nucleation stage serve as the growth centers for the rigid framework formed during this second or "development stage" of the heat treatment cycle.

This development stage is necessary in most, though not all, compositions described herein. Its purpose is to provide a rigid skeletal crystalline framework to support the remaining glassy matrix when the temperature is raised above the fiber softening point to complete crystallization. The importance of such a development treatment, as indicated by strength determinations, is well pointed out in Table XII.

C. Finally, the rigidified framework and predominantly glassy matrix from the development portion of the heat treat cycle is crystallized to "substantial completeness" by the maintenance of the article at a temperature 150° to 300° F. above the fiber softening point (log 7.65) of the original glass composition. The term "substantial completeness" is used to indicate "complete so far as desired." For maximum physical properties, a completeness of 90 to 95% crystalline is usually desired, although the degree of completeness can be varied over a much wider range, 50–98%, by varying the heat treatment to obtain other or different physical properties.

This last stage actually results in the conversion of the majority of the composition to a crystalline structure and thus is known as the "crystallization stage."

In each of the following examples except those in Table XII, the heat treatment has been carried out in three successive stages at the specified temperatures for the specified times. In actual practice, it has been found that the maintenance of a strict time and temperature schedule as above set forth may not be necessary. For example, it is sometimes feasible to maintain the nucleation temperature as described and then pass directly to the crystallization stage by merely passing through the development stage. However, very few of these compositions can be heat treated in this fashion without some deformation and loss of strength. In cases where these factors are not too important, considerable time can be saved. In any event, the entire heat treat cycle can be carried out in a single lehr with the lehr belt continuously advancing the article through successive nucleation, development, and crystallization zones.

FLEXURAL STRENGTH DETERMINATIONS

To determine the flexural strengths of samples as hereinafter set forth, the following technique was utilized:

*Preparation of Samples*

Lengths of cane were drawn from a crucible of the described molten glass. Sample cane diameters averaged about 0.100″. After cooling, the lengths were cut into 2½″ sections and divitrified according to the appropriate heat schedule. After devitrifications, the diameter of each sample was measured with a micrometer. Prior to testing, each sample was abused or abraded with 320 mesh grit paper.

When large tank melts were made, 0.4″ and 0.5″ diameter rods were vacuum drawn from the melt. These rods were given the same treatment as above.

*Testing.*—All samples were tested on an "Instron" machine as simple beams using 3 point, center loading. The sample cane lengths were tested over a 2″ span while the larger rod lengths were tested over a 4″ span. All samples were tested at a rate of loading of 0.1″ per min. which means that the load is applied through constant movement of the crosshead. The "Instron" was capable of accurate testing at loads ranging from 2 grams to 10,000 lbs.±less than 1%. The load is automatically recorded on an X—Y recorder.

*Calculation.*—Calculation of flexural strength from breaking load and sample diameter was made using the standard formula for flexural stress at the extreme fiber:

$$f = \frac{\text{Moment}}{\text{Section modulus}}$$

Since most samples were elliptical rather than circular in cross-section, the section modulus was calculated using the ellipse formula. The moment for a simple beam with a concentrated center load was calculated from the standard formula.

The number of samples tested varied; at least four samples were tested for each composition and the value given in each example is an average value.

The following glass composition was prepared and melted:

*Table III*

BASE COMPOSITION

| Ingredient (Example 1): | Percent by weight |
|---|---|
| $SiO_2$ | 47.2 |
| $Al_2O_3$ | 31.0 |
| MgO | 11.25 |
| NaF | 0.73 |
| $ZrO_2$ | 8.0 |
| $TiO_2$ | 1.5 |
| $SnO_2$ | 0.2 |

Test samples were drawn from the melted composition and heat treated according to the schedule:

1.5 hours at 1420° F.
1.5 hours at 1740° F.
1.5 hours at 1950° F.

The heat treated samples were tested for flexural strength as above described and flexural strengths averaging 60,000 pounds per square inch were determined. It was determined by X-ray analysis that the heat treated samples were well devitrified within the range of from 90 to 95% crystalline and that the predominate crystalline phase was mullite with sapphirine and tridymite as secondary phases.

To determine the effect of $Li_2O$ additions on the base composition, the following compositions were prepared and melted:

*Table IV*

EFFECT OF $LiO_2$

| | Percent by weight | | | | | |
|---|---|---|---|---|---|---|
| Examples | 1 | 2 | 3 | 4 | 5 | 6 |
| Ingredient: | | | | | | |
| $SiO_2$ | 47.2 | 46.9 | 46.9 | 47.2 | 47.2 | 47.2 |
| $Al_2O_3$ | 31.0 | 30.8 | 30.8 | 31.0 | 31.0 | 31.0 |
| MgO | 11.25 | 11.2 | 11.2 | 10.2 | 9.2 | 8.2 |
| NaF | 1.0 | 1.0 | 1.0 | 1.0 | 1.0 | 1.0 |
| $ZrO_2$ | 8.0 | 8.0 | 8.0 | 8.0 | 8.0 | 8.0 |
| $TiO_2$ | 1.5 | 1.5 | 1.5 | 1.5 | 1.5 | 1.5 |
| $SnO_2$ | 0.2 | 0.2 | 0.2 | 0.2 | 0.2 | 0.2 |
| $Li_2O$ | | 0.5 | 0.75 | 1.0 | 2.0 | 3.0 |

HEAT TREATMENTS (° F.)

| 1.5 hours at | 1,450 / 1,740 / 1,950 | 1,420 / 1,720 / 1,950 | 1,400 / 1,700 / 1,950 | 1,420 / 1,720 / 1,950 | 1,420 / 1,720 / 1,920 | 1,420 / 1,720 / 1,900 | 1,420 / 1,720 / 1,900 |

| Flexural strengths (p.s.i.) | 60,000 | 114,250 | 101,520 | 77,760 | 53,290 | 42,460 |

CRYSTALLINE PHASES—PREDOMINANT [Examples]

| 1 | 2 | 3 | 4 | 5 | 6 |
|---|---|---|---|---|---|
| Mullite | Mullite | Mullite | Mullite | +B Spodumene. | +B Spodumene. |
| Tridymite | Sapphirine | Sapphirine | Sapphirine | | |
| Sapphirine | Tridymite | Tridymite | | | |

Thus it will be seen that $Li_2O$ in limited quantity acts as a devitrification promoter and dramatically increases the flexural strength of the devitrified product; however, the effect is lost as the amount increases beyond 1.0%. It should be emphasized that even the lowest values shown here still represent usable materials.

To assess the effect of LiF additions to the base composition, the following compositions were prepared and melted:

Table V
EFFECT OF LiF

| Examples | Percent by Weight | | | | | |
|---|---|---|---|---|---|---|
| | 1 | 7 | 8 | 9 | 10 | 11 |
| Ingredient: | | | | | | |
| SiO$_2$ | 47.2 | 47.5 | 47.2 | 47.2 | 47.2 | 47.2 |
| Al$_2$O$_3$ | 31.0 | 31.2 | 31.0 | 31.1 | 31.1 | 31.1 |
| MgO | 11.25 | 11.1 | 11.0 | 10.5 | 10.0 | 9.5 |
| NaF | 1.0 | | | | | |
| ZrO$_2$ | 8.0 | 8.0 | 8.0 | 8.0 | 8.0 | 8.0 |
| TiO$_2$ | 1.5 | 1.5 | 1.5 | 1.5 | 1.5 | 1.5 |
| SnO$_2$ | 0.2 | 0.2 | 0.2 | 0.2 | 0.2 | 0.2 |
| LiF | | 0.5 | 1.0 | 1.5 | 2.0 | 3.0 |

HEAT TREATMENT (° F.)

| 1.5 hours at | 1,450 | 1,450 | 1,450 | 1,450 | 1,450 | 1,450 |
|---|---|---|---|---|---|---|
| | 1,740 | 1,720 | 1,720 | 1,720 | 1,720 | 1,770 |
| | 1,950 | 1,950 | 1,920 | 1,950 | 1,950 | 1,950 |

| Flexural Strengths (p.s.i.) | 60,000 | 140,770 | 131,500 | 108,310 | 99,610 | 40,770 |
|---|---|---|---|---|---|---|

CRYSTALLINE PHASES—PREDOMINANT [Examples]

| 1 | 7 | 8 | 9 | 10 | 11 |
|---|---|---|---|---|---|
| Mullite. Tridymite. Sapphirine | Tridymite. Sapphirine. | Tridymite. Sapphirine. | Tridymite. Sapphirine. Mullite. | Cordierite. Mullite. | Mullite. Tridymite. Sapphirine. |

From examples above it will be seen that LiF in amounts ranging from 0.5 to 2.0% of the composition dramatically increases the flexural strength when substituted for NaF and MgO in the base composition. In amounts greater than about 2.0% LiF, no material benefit is realized. It should be noted that the lithium ion and the fluorine ion are the important additives and may be added separately as MgF$_2$ or AlF$_3$ and Li$_2$CO$_3$ or spodumene.

Once the glass is melted, the manner of addition of either ion is immaterial, although losses of fluorine will be less if highly stable fluoride salts are used. (See Table VI.)

Table VI
EFFECT OF OTHER FLUORIDES LI+ ADDED AS Li$_2$CO$_3$)

| Examples | Percent by Weight | | |
|---|---|---|---|
| | 12 (F$_2$ added as LiF) | 13 (F$_2$ added as MgF$_2$) | 14 (F$_2$ added as AlF$_3$) |
| Ingredient: | | | |
| SiO$_2$ | 47.6 | 47.6 | 47.6 |
| Al$_2$O$_3$ | 31.3 | 31.3 | 30.65 |
| AlF$_3$ | | | 1.08 |
| MgO | 11.1 | 10.7 | 11.1 |
| MgF$_2$ | | 1.1 | |
| Li$_2$O | | 0.58 | 0.58 |
| LiF | 1.0 | | |
| ZrO$_2$ | 7.0 | 7.0 | 7.0 |
| TiO$_2$ | 1.5 | 1.5 | 1.75 |
| SnO$_2$ | 0.2 | 0.2 | 0.2 |

HEAT TREATMENT (° F.)

| 1 hour at | 1,450 | 1,450 | 1,450 |
|---|---|---|---|
| 1.5 hours at | 1,680 | 1,680 | 1,680 |
| | 1,950 | 1,950 | 1,980 |

| Flexural Strength (p.s.i.) | 160,730 | 133,540 | 119,160 |
|---|---|---|---|

| Crystalline Phases | Tridymite. Mullite. Sapphirine | Tridymite. Mullite. Sapphirine | Tridymite. Mullite. Sapphirine. |
|---|---|---|---|

The effect of B$_2$O$_3$ was studied by the replacement of a portion of the Al$_2$O$_3$ content of the base composition as follows:

TABLE VII
EFFECT OF B$_2$O$_3$

| Examples | Percent by Weight | | | | |
|---|---|---|---|---|---|
| | 3 | 15 | 16 | 17 | 18 |
| Ingredient: | | | | | |
| SiO$_2$ | 46.9 | 46.9 | 46.9 | 46.9 | 46.9 |
| Al$_2$O$_3$ | 30.8 | 29.0 | 27.5 | 26.5 | 30.5 |
| MgO | 11.2 | 11.2 | 11.2 | 11.2 | 11.2 |
| NaF | 1.0 | 1.0 | 1.0 | 1.0 | 1.0 |
| ZrO$_2$ | 8.0 | 8.0 | 8.0 | 8.0 | 8.0 |
| TiO$_2$ | 1.5 | 1.5 | 1.5 | 1.5 | 1.5 |
| SnO$_2$ | 0.2 | 0.2 | 0.2 | 0.2 | 0.2 |
| Li$_2$O | 0.75 | 0.75 | 0.75 | 0.75 | 0.75 |
| B$_2$O$_3$ | | 2.0 | 3.0 | 4.0 | 5.0 |

HEAT TREATMENT (° F.)

| 1.5 hours at: | 1,400 | 1,450 | 1,450 | 1,450 | 1,450 |
|---|---|---|---|---|---|
| | 1,700 | 1,680 | 1,700 | 1,650 | 1,680 |
| | 1,950 | 1,980 | 1,950 | 1,920 | 1,980 |

| Flexural Strength (p.s.i.) | 101,520 | 57,140 | 42,860 | 51,840 | 60,400 |
|---|---|---|---|---|---|

| Examples | 3 | 15 | 16 | 17 | 18 |
|---|---|---|---|---|---|
| Crystalline Phases | Mullite. Sapphirine. Tridymite. | Mullite. Sapphirine. | Mullite. Sapphirine. | Mullite. Sapphirine. | Sapphirine. Enstatite. |

| Examples | 3 | 15 | 16 | 17 | 18 |
|---|---|---|---|---|---|
| Coefficient of Expansion (0° to 300° F. ×10$^{-7}$) | 110.6 | 106.0 | 87.3 | 52 | 48 |

Thus the substitution of B$_2$O$_3$ for a part of the Al$_2$O$_3$ content generally decreases the flexural strength but lowers the coefficient of expansion as the B$_2$O$_3$ content is increased from 2.0% to 5.0%.

B$_2$O$_3$ can also be substituted for a portion of the SiO$_2$—Al$_2$O$_3$ combined content of the base compositions, as follows:

Table VIII

| Examples | Percent by Weight | | | | |
|---|---|---|---|---|---|
| | 19 | 20 | 21 | 22 | 23 |
| Ingredient: | | | | | |
| SiO$_2$ | 46.6 | 46.3 | 45.7 | 45.1 | 43.9 |
| Al$_2$O$_3$ | 30.3 | 30.1 | 29.7 | 29.3 | 28.5 |
| MgO | 11.2 | 11.2 | 11.2 | 11.2 | 11.2 |
| NaF | 1.0 | 1.0 | 1.0 | 1.0 | 1.0 |
| ZrO$_2$ | 8.0 | 8.0 | 8.0 | 8.0 | 8.0 |
| TiO$_2$ | 1.5 | 1.5 | 1.5 | 1.5 | 1.5 |
| SnO$_2$ | 0.2 | 0.2 | 0.2 | 0.2 | 0.2 |
| Li$_2$O | 0.75 | 0.75 | 0.75 | 0.75 | 0.75 |
| B$_2$O$_3$ | 0.5 | 1.0 | 2.0 | 3.0 | 5.0 |

HEAT TREATMENT (° F.)

| 1.5 hours at | 1,450 | 1,450 | 1,450 | 1,450 | 1,450 |
|---|---|---|---|---|---|
| | 1,700 | 1,700 | 1,700 | 1,700 | 1,680 |
| | 1,950 | 1,950 | 1,950 | 1,950 | 1,900 |

| Flexural Strength (p.s.i.) | 76,620 | 84,440 | 54,460 | 62,000 | 41,070 |
|---|---|---|---|---|---|

Table VIII—Continued

| Examples | 19 | 20 | 21 | 22 | 23 |
|---|---|---|---|---|---|
| Crystalline Phases | Mullite. Sapphirine. | Mullite. Sapphirine. | Mullite. Sapphirine. | Mullite. Sapphirine. Tridymite. | Sapphirine. |
|  |  | Tridymite. |  |  |  |

| Examples | 19 | 20 | 21 | 22 | 23 |
|---|---|---|---|---|---|
| Coefficient of Expansion (0° to 300° F.×10⁻⁷) | 104.1 | 106.2 | ------ | 58.3 | 57.2 |

Although the substitution of $B_2O_3$ for the combined $SiO_2$—$Al_2O_3$ content lowers the coefficient of expansion, the flexural strength is also lowered, becoming less than 45,000 p.s.i. when the $SiO_2$ content drops below 45%.

The minimum amount of $ZrO_2$ necessary as a nucleant was studies as follows:

Table IX
EFFECT OF ZrO₂ CONTENT

| | Percent by Weight | | | | | |
|---|---|---|---|---|---|---|
| Examples | 2 | 24 | 25 | 26 | 27 | 28 |
| Ingredient: | | | | | | |
| SiO₂ | 46.9 | 47.1 | 47.4 | 47.6 | 57.9 | 48.4 |
| Al₂O₃ | 30.8 | 30.9 | 31.1 | 31.3 | 31.4 | 31.8 |
| MgO | 11.2 | 11.25 | 11.3 | 11.4 | 11.4 | 11.6 |
| NaF | 1.0 | 1.0 | 1.0 | 1.0 | 1.0 | 1.0 |
| Li₂O | 0.5 | 0.5 | 0.5 | 0.5 | 0.5 | 0.5 |
| ZrO₂ | 8.0 | 7.5 | 7.0 | 6.5 | 6.0 | 5.0 |
| TiO₂ | 1.5 | 1.5 | 1.5 | 1.5 | 1.5 | 1.5 |
| SnO₂ | 0.2 | 0.2 | 0.2 | 0.2 | 0.2 | 0.2 |

HEAT TREATMENT (° F.)

| | | | | | | |
|---|---|---|---|---|---|---|
| 1.5 hours at | 1,420 1,720 1,950 | 1,420 1,720 1,950 | 1,420 1,720 1,950 | 1,420 1,720 1,950 | 1,420 1,720 1,950 | 1,420 1,720 1,950 |
| Flexural Strength (p.s.i.) | 114,250 | 107,190 | 75,520 | 78,130 | 82,890 | 40,970 |
| Crystalline Phases—Predominant | Mullite Sapphirine Tridymite | | | | | |

Thus it will be seen that nucleating efficiency as shown by strength of the material falls off considerably when the $ZrO_2$ content drops below 6.0% or the combined $ZrO_2$—$TiO_2$ drops below 7.5%.

Table X
COMPARISON OF ZrO₂-TiO₂ WITH TiO₂ ALONE

| | Percent by Weight | |
|---|---|---|
| Examples | 29 | 30 |
| Ingredient: | | |
| SiO₂ | 47.6 | 47.6 |
| Al₂O₃ | 31.3 | 31.3 |
| MgO | 11.1 | 11.1 |
| LiF | 1.0 | 1.0 |
| ZrO₂ | 7.0 | ------ |
| TiO₂ | 1.75 | 8.75 |
| SnO₂ | 0.2 | 0.2 |

HEAT TREATMENT (° F.)

| | | |
|---|---|---|
| Hours at | 1,450–1½ 1,680–1½ 1,950–1½ | 1,350–1 1,580–1 1,820–1½ |
| Flexural Strength (p.s.i.) | 160,730 | 79,210 |
| Crystalline Phases | Tridymite Mullite Sapphirine | |

Examples illustrating secondary nucleating agents in combination with $ZrO_2$.

Table XI

| | Percent by Weight | | | | | | |
|---|---|---|---|---|---|---|---|
| Examples | 31 | 32 | 33 | 34 | 35 | 36 | 37 |
| Ingredient: | | | | | | | |
| SiO₂ | 47.6 | 47.6 | 47.6 | 47.6 | 47.6 | 47.6 | 47.6 |
| Al₂O₃ | 31.3 | 31.3 | 31.3 | 31.3 | 31.3 | 31.3 | 31.3 |
| MgO | 11.1 | 11.1 | 11.1 | 11.1 | 11.1 | 11.1 | 11.1 |
| LiF | 1.0 | 1.0 | 1.0 | 1.0 | 1.0 | 1.0 | 1.0 |
| ZrO₂ | 7.0 | 8.0 | 8.0 | 8.0 | 8.0 | 8.0 | 8.0 |
| SnO₂ | 0.2 | 0.2 | 0.2 | 0.2 | 0.2 | 0.2 | 0.2 |
| TiO₂ | 1.8 | | | | | | |
| MoO₃ | | 0.8 | | | | | |
| Fe₂O₃ | | | 0.8 | | | | |
| V₂O₅ | | | | 0.8 | | | |
| CoO | | | | | 0.8 | | |
| NiO | | | | | | 0.8 | |
| ThO₂ | | | | | | | 0.8 |

HEAT TREATMENT (° F)

| | | | | | | | |
|---|---|---|---|---|---|---|---|
| 1 hour at: | 1,450 1,680 | 1,400 1,650 | 1,450 1,680 | 1,450 1,680 | 1,450 1,680 | 1,450 1,680 | 1,425 1,690 |
| 1.5 hrs. at | 1,950 | 1,900 | 1,950 | 1,950 | 1,950 | 1,950 | 1,780 |

| Flexural Strength (p.s.i.) | 160,730 | 32,340 | 73,100 | 104,100 | 54,410 | 80,230 | 42,570 |
|---|---|---|---|---|---|---|---|

| Crystalline Phases—Predominant | Tridymite Mullite Sapphirine |
|---|---|

To determine the effect of the heat treatment cycle upon the final developed strength of the devitrified compositions, the composition of Example 3 of Table IV was melted and heat treated as follows:

Table XII
EFFECT OF DEVELOPMENT TEMPERATURE ON STRENGTH

| Heat Treat Temperatures (° F.) | | | Strength |
|---|---|---|---|
| Nucleation | Development | Crystallization | |
| 1,420 | None | 1,950 | 19,780 |
| 1,420 | 1,700 | 1,950 | 78,940 |
| 1,450 | None | 1,980 | 56,660 |
| 1,450 | 1,650 | 1,980 | 77,770 |
| 1,500 | None | 1,980 | 114,350 |
| 1,500 | 1,680 | 1,980 | 123,870 |

In each instance, the maintenance of the article at a development temperature resulted in the development of greater strength in the final product.

Examples of compositions modified by addition of soda-lime cullet:

Table XIII

| | Percent by Weight | |
|---|---|---|
| Example | 38 | 39 |
| Ingredient: | | |
| SiO₂ | 48.0 | 49.0 |
| Al₂O₃ | 30.0 | 29.0 |
| MgO | 10.5 | 10.0 |
| Na₂O | 0.7 | 1.2 |
| ZrO₂ | 7.5 | 7.2 |
| TiO₂ | 1.5 | 1.4 |
| SnO₂ | 0.2 | 0.2 |
| LiF | 1.0 | 0.9 |
| CaO | 0.6 | 1.2 |

Heat Treatment ° F.

| | | |
|---|---|---|
| 1.5 hours at | 1,420 1,650 1,920 | 1,420 1,650 1,950 |
| Flexural Strength (p.s.i.) | 120,420 | 60,740 |
| Crystalline Phases | Mullite Sapphirine | Mullite. Sapphirine. |

Thus, soda-lime glass cullet can be added to the base composition, so as to vary its composition and the crystal-to-glassy matrix ratio in the final devitrified product.

The embodiments of the invention in which an exclusive property or privilege is claimed, are defined as follows:

1. In a method of making a devitrified product, the steps of melting glass batch materials and forming a glass consisting essentially of:

| Ingredient— | Percent by weight |
|---|---|
| $SiO_2$ | 40 to 60 |
| $Al_2O_3$ | 17 to 32 |
| MgO | 6 to 12 |
| $ZrO_2$ | At least 6 | and a secondary nucleant, said secondary nucleant being present in an amount less than 2 weight percent, the sum of $ZrO_2$ and said secondary nucleant being at least 7.5 weight percent of the glass, and heat treating the resulting glass until a crystalline product containing at least 50 weight percent crystalline material is obtained.

2. The method of claim 1, wherein the secondary nucleant is selected from the group consisting of $TiO_2$, $MoO_3$, $Fe_2O_3$, $V_2O_5$, CoO, NiO and $ThO_2$.

3. A method as defined in claim 2, wherein the batch also contains:

| Ingredient— | Percent by weight |
|---|---|
| $SnO_2$ | 0–2 |
| NaF | 0–3 |
| $Na_2O$ | 0–2 |
| $K_2O$ | 0–3 |
| $CaF_2$ | 0–8 |
| $Li_2O$ | 0–5 |
| LiF | 0–5 |
| $B_2O_3$ | 0–5 |
| CaO | 0–10 |
| PbO | 0–5 |
| BaO | 0–10 |

4. A method as defined in claim 2, wherein the batch also contains a material selected from the following group in the indicated amounts:

| Ingredient— | Percent by weight |
|---|---|
| $SnO_2$ | 0.05–1 |
| NaF | 0.05–1 |
| $Na_2O$ | 0.05–1 |
| $K_2O$ | 0.05–1 |
| $CaF_2$ | 0.05–2 |
| $Li_2O$ | 0.05–2 |
| LiF | 0.05–2 |
| $B_2O_3$ | 0.05–3 |
| CaO | 0.05–5 |
| PbO | 0.05–2 |
| BaO | 0.05–2 |

5. A method as defined in claim 2, wherein the $ZrO_2$ content of the glass is about 7% by weight and the secondary nucleating oxide content is about 1.5% by weight of the batch.

6. A method as defined in claim 2, wherein the heat treatment comprises successively maintaining, the composition at temperatures corresponding to viscosities of log 13.5, log 8 to log 12, and a range of from 100° F. to 300° F. above log 7.65.

7. A method as defined in claim 2, wherein the secondary nucleating oxide is $TiO_2$.

8. In a method of making a devitrified product, the steps of melting and forming a glass consisting essentially of:

| Ingredient— | Percent by weight |
|---|---|
| $SiO_2$ | 40 to 70 |
| $Al_2O_3$ | 15 to 35 |
| MgO | 5 to 15 |
| $ZrO_2$ | At least 6 | and a secondary nucleant, forming an article from said glass, forming submicroscopic nuclei in the article, maintaining the article at a development temperature corresponding to a viscosity of log 8 to log 12 for a period of time sufficient to develop a rigid crystalline framework in the article, and subsequently substantially completely crystallizing the remainder of the article, said secondary nucleant being selected from the group consisting of $TiO_2$, $MoO_3$, $FeO_3$, $V_2O_5$, CoO, NiO and $ThO_2$, the sum of $ZrO_2$ and said secondary nucleant being at least 7.5 weight percent of said glass.

9. The method of claim 8, wherein the nuclei are formed at a temperature corresponding substantially to the annealing point and the crystallization occurs at a temperature corresponding to 100° F. to 300° F. above log 7.65.

10. In a method of making a devitrified product, the steps of melting and forming a vitreous composition consisting essentially of

| | Percent |
|---|---|
| $SiO_2$ | 40–70 |
| $Al_2O_3$ | 15–35 |
| MgO | 5–15 |
| LiF | 0.5–3 |
| $ZrO_2$ | At least 6 | and a secondary nucleant, and heat treating the formed vitreous composition to devitrify the same, said secondary nucleant being selected from the group consisting of $TiO_2$, $MoO_3$, $Fe_2O_3$, $V_2O_5$, CoO, NiO, and $ThO_2$, and the sum of $ZrO_2$ and said secondary nucleant being at least 7.5 weight percent of the product.

11. In a method of making a devitrified product, the steps of melting and forming a vitreous composition consisting essentially of

| | Percent |
|---|---|
| $SiO_2$ | 40–70 |
| $Al_2O_3$ | 15–35 |
| MgO | 5–15 |
| $LiO_2$ | 0.5–5 |
| $ZrO_2$ | At least 6 | and a secondary nucleant and heat treating the formed vitreous composition to devitrify the same, said secondary nucleant being selected from the group consisting of $TiO_2$, $MoO_3$, $Fe_2O_3$, $V_2O_5$, CoO, NiO, and $ThO_2$, and the sum of $ZrO_2$ and said secondary nucleant being at least 7.5 weight percent of the product.

12. In a method of making a devitrified product, the steps of melting and forming a vitreous composition consisting essentially of

| | Percent |
|---|---|
| $SiO_2$ | 40–70 |
| $Al_2O_3$ | 15–35 |
| MgO | 5–15 |
| $B_2O_3$ | 0.5–5 |
| $ZrO_2$ | At least 6 | and a secondary nucleant and heat treating the formed vitreous composition to devitrify the same, said secondary nucleant being selected from the group consisting of $TiO_2$, $MoO_3$, $Fe_2O_3$, $V_2O_5$, CoO, NiO, and $ThO_2$, and the sum of $ZrO_2$ and said secondary nucleant being at least 7.5 weight percent of the product.

13. In a method of making a devitrified product, the steps of melting and forming a vitreous composition consisting essentially of

| | Percent |
|---|---|
| $SiO_2$ | 40–70 |
| $Al_2O_3$ | 15–35 |
| MgO | 5–15 |
| $SnO_2$ | 0.5–2 |
| $ZrO_2$ | At least 6 | and a secondary nucleant, and heat treating the formed vitreous composition to devitrify the same, said secondary nucleant being selected from the group consisting of $TiO_2$, $MoO_3$, $Fe_2O_3$, $V_2O_5$, CoO, NiO, and $ThO_2$, and the sum of $ZrO_2$ and said secondary nucleant being at least 7.5 weight percent of the product.

14. In a method of making a devitrified product, the steps of melting and forming a vitreous composition consisting essentially of

| Ingredient | Percent |
|---|---|
| $SiO_2$ | 40–70 |
| $Al_2O_3$ | 15–35 |
| MgO | 5–15 |
| NaF | 0.5–3 |
| $ZrO_2$ | At least 6 | and a secondary nucleant, and heat treating the formed vitreous composition to devitrify the same, said secondary nucleant being selected from the group consisting of $TiO_2$, $MoO_3$, $Fe_2O_3$, $V_2O_5$, CoO, NiO, and $ThO_2$, and the sum of $ZrO_2$ and said secondary nucleant being at least 7.5 weight percent of the product.

15. In a method of making a devitrified product by the nucleation of a vitreous composition consisting essentially of:

| Ingredient | Percent by weight |
|---|---|
| $SiO_2$ | 40 to 70 |
| $Al_2O_3$ | 15 to 35 |
| MgO | 5 to 15 |
| $ZrO_2$ | At least 6 | and a secondary nucleant selected from the group consisting of $TiO_2$, $MoO_3$, $Fe_2O_3$, $V_2O_5$, CoO, and NiO, and $ThO_2$ in an amount less than 2 weight percent, the sum of the $ZrO_2$ and said secondary nucleant being at least 7.5 percent of the composition, to effect the formation of a myriad of submicroscopic nuclei distributed throughout the vitreous mass, the improvement of developing a rigid crystalline framework by heating said nucleated mass to a temperature corresponding to from about 10 to 30° F. below the fiber softening point of said composition and maintaining said temperature for a period of time sufficient to develop in said mass a rigid skeletal crystalline framework.

16. In a method of making a devitrified product from a melted and formed vitreous mass consisting essentially of:

| Ingredient | Percent by weight |
|---|---|
| $SiO_2$ | 40 to 70 |
| $Al_2O_3$ | 15 to 35 |
| MgO | 5 to 15 |
| $ZrO_2$ | At least 6 | and a secondary nucleant selected from the group consisting of $TiO_2$, $MoO_3$, $Fe_2O_3$, $V_2O_5$, CoO, and NiO, and $ThO_2$ in an amount less than 2 weight percent, the sum of the $ZrO_2$ and said secondary nucleant being at least 7.5 percent of the mass, the steps of heat-treating the mass in accordance with the following schedule:
   A. Maintaining the mass at a temperature from 20° F. below to 50° F. above the annealing temperature to develop submicroscopic nuclei therein;
   B. Maintaining the nucleated mass at a temperature of from 10° F. to 30° F. below the fiber softening point to develop a rigid crystalline framework therein; and
   C. Maintaining the article at a temperature of from 150° F. to 300° F. above the fiber softening point to substantially completely crystallize the mass.

17. A thermally crystallizable glass having the following composition:

| Ingredient | Percent by weight |
|---|---|
| $SiO_2$ | 40 to 60 |
| $Al_2O_3$ | 17 to 32 |
| MgO | 6 to 12 |
| $ZrO_2$ | At least 6 | and a secondary nucleant in an amount less than 2 weight percent, the sum of $ZrO_2$ and said secondary nucleant being at least 7.5 weight percent of the composition.

18. The glass of claim 17 wherein the secondary nucleant is selected from the group consisting of $TiO_2$, $MoO_3$, $Fe_2O_3$, $V_2O_5$, CoO, NiO, and $ThO_2$.

19. The glass of claim 18 wherein the composition also contains:

| Ingredient | Percent by weight |
|---|---|
| $SnO_2$ | 0–2 |
| NaF | 0–3 |
| $Na_2O$ | 0–2 |
| $K_2O$ | 0–3 |
| $CaF_2$ | 0–8 |
| $Li_2O$ | 0–5 |
| LiF | 0–5 |
| $B_2O_3$ | 0–5 |
| CaO | 0–10 |
| PbO | 0–5 |
| BaO | 0–10 |

20. The glass of claim 18 wherein the composition also contains a material selected from the following group in the indicated amounts:

| Ingredient | Percent by weight |
|---|---|
| $SnO_2$ | 0.05–1 |
| NaF | 0.05–1 |
| $Na_2O$ | 0.05–1 |
| $K_2O$ | 0.05–1 |
| $CaF_2$ | 0.05–2 |
| $Li_2O$ | 0.05–2 |
| LiF | 0.05–2 |
| $B_2O_3$ | 0.05–3 |
| CaO | 0.05–5 |
| PbO | 0.05–2 |
| BaO | 0.05–2 |

21. The glass of claim 17 wherein the $ZrO_2$ content is about 7% by weight and the secondary nucleant content is about 1.5% by weight.

22. The glass of claim 17 wherein the secondary nucleant is $TiO_2$.

23. A method of claim 1 wherein said heat treatment is effected to obtain a product that is 90–95 weight percent crystalline.

24. A thermally crystallizable glass having the following composition:

| Ingredient | Percent by weight |
|---|---|
| $SiO_2$ | 40 to 70 |
| $Al_2O_3$ | 15 to 35 |
| MgO | 5 to 15 |
| $ZrO_2$ | At least 6 | and a secondary nucleant selected from the group consisting of $TiO_2$, $MoO_3$, $Fe_2O_3$, $V_2O_5$, CoO, NiO, and $ThO_2$ in an amount less than 2 weight percent, the sum of the $ZrO_2$ and said secondary nucleant being at least 7.5 percent of the composition.

25. A devitrified product consisting essentially of 40 to 70 weight percent $SiO_2$, 15 to 35 weight percent $Al_2O_3$, 5 to 15 weight percent MgO, and at least 6 weight percent $ZrO_2$, and a secondary nucleant, said product being crystallized to substantial completeness, and said secondary nucleant being selected from the group consisting of $TiO_2$, $MoO_3$, $Fe_2O_3$, $V_2O_5$, CoO, NiO, and $ThO_2$, and the sum of $ZrO_2$ and said secondary nucleant being at least 7.5 weight percent of the product.

26. A product of thermal devitrification of a glass consisting essentially of 40 to 70 weight percent $SiO_2$, 15 to 35 weight percent $Al_2O_3$, 5 to 15 weight percent MgO, at least 6 weight percent $ZrO_2$, and a secondary nucleant, said product consisting of 50–98 weight percent crystals dispersed in the 50–2 weight percent vitreous material, and said secondary nucleant being selected from the group consisting of $TiO_2$, $MoO_3$, $Fe_2O_3$, $V_2O_5$, CoO, NiO and $ThO_2$, the sum of $ZrO_2$ and said secondary nucleant being at least 7.5 weight percent of the product.

27. A product of claim 26 wherein said secondary nucleant comprises $V_2O_5$.

28. A product of claim 26 wherein said secondary nucleant comprises $Fe_2O_3$.

28. A product of claim 26 wherein said secondary nucleant comprises NiO.

30. A product of claim 26 wherein said secondary nucleant is 1–1.75 weight percent $TiO_2$.

31. A product of claim 26 which also contains 0.05–2 weight percent $CaF_2$.

32. A thermally crystallizable glass having 40–70 weight percent $SiO_2$, 15–35 weight percent $Al_2O_3$, 5–15 weight percent MgO, at least 6 weight percent $ZrO_2$ and an oxide selected from the group consisting of $TiO_2$, $MoO_3$, $Fe_2O_3$, $V_2O_5$, CoO, NiO, and $ThO_2$ in an amount less than 2 weight percent, the sum of the $ZrO_2$ and the selected oxide being at least 7.5 but less than 10 weight percent of the composition.

33. A product of thermal devitrification of the glass consisting essentially of 40–70 weight percent $SiO_2$, 15–35 weight percent $Al_2O_3$, 5–15 weight percent MgO, at least 6 weight percent $ZrO_2$, and an oxide selected from the group consisting of the group $TiO_2$, $MoO_3$, $Fe_2O_3$, $V_2O_5$, CoO, NiO, and $ThO_2$, the sum of said $ZrO_2$ and said selected oxide being at least 7.5 but less than 10 weight percent of the glass, the product consisting essentially of at least 50% crystalline material dispersed in the vitreous material left after the thermal devitrification of said glass.

34. In a method of making a product of crystallization of glass, the steps of melting glass batch ingredients to produce a glass consisting essentially of 40–60 weight percent $SiO_2$, 17–32 weight percent $Al_2O_3$, 6–12 weight percent MgO, at least 6 weight percent of $ZrO_2$, and an oxide selected from the group consisting of $TiO_2$ $MoO_3$, $Fe_2O_3$, $V_2O_5$, CoO, NiO, and $ThO_2$, said $ZrO_2$ and said selected oxide being at least 7.5 but less than 10 weight percent of said glass, and heat treating the resulting glass composition until a crystalline product containing at least 50% crystalline material is obtained.

References Cited in the file of this patent

UNITED STATES PATENTS

| | | |
|---|---|---|
| 1,086,113 | Wolf-Burckhardt et al. | Feb. 3, 1914 |
| 1,394,296 | Fisher | Oct. 18, 1921 |
| 2,779,136 | Hood et al. | Jan. 29, 1957 |
| 2,873,197 | McMullen | Feb. 10, 1959 |
| 2,920,971 | Stookey | Jan. 12, 1960 |
| 3,006,775 | Chen | Oct. 31, 1961 |
| 3,022,179 | Morrissey | Feb. 20, 1962 |
| 3,022,180 | Morrissey et al. | Feb. 20, 1962 |

FOREIGN PATENTS

| | | |
|---|---|---|
| 1,082,016 | Germany | May 19, 1960 |
| 1,099,135 | Germany | Feb. 9, 1961 |

OTHER REFERENCES

Chemical Abstracts, July 10, 1959, item 12615c, "Vitrokeram."

Harmon: Ceramic Industry, "New Concept Is Basis for Developing New, Better Ceramics," August 1959 (pages 52–53).

UNITED STATES PATENT OFFICE
CERTIFICATE OF CORRECTION

Patent No. 3,117,881                                            January 14, 1964

Kenneth M. Henry et al.

It is hereby certified that error appears in the above numbered patent requiring correction and that the said Letters Patent should read as corrected below.

Column 1, line 23, for "1000,000" read -- 100,000 --; column 5, line 52, for "devitrifications" read -- devitrification --; column 9, line 20, for "studies" read -- studied --; column 10, lines 51 and 52, for "soda-line" read -- soda-lime --; column 12, line 8, for "FeO$_3$" read -- Fe$_2$O$_3$ --.

Signed and sealed this 16th day of June 1964.

(SEAL)
Attest:

ERNEST W. SWIDER                                           EDWARD J. BRENNER
Attesting Officer                                                Commissioner of Patents